US007097692B2

(12) United States Patent
Southland et al.

(10) Patent No.: US 7,097,692 B2
(45) Date of Patent: Aug. 29, 2006

(54) AIR FILTER ARRANGEMENT AND METHOD OF MAKING SAME

(75) Inventors: Stephen Gerald Southland, Magnolia, TX (US); Bryant Eugene Swart, St. Joseph, MI (US)

(73) Assignee: SDS Industries, LLC, Grand Haven, MI (US)

( * ) Notice: Subject to any disclaimer, the term of this patent is extended or adjusted under 35 U.S.C. 154(b) by 210 days.

(21) Appl. No.: 10/654,581

(22) Filed: Sep. 3, 2003

(65) Prior Publication Data

US 2005/0044828 A1 Mar. 3, 2005

(51) Int. Cl.
*B01D 46/00* (2006.01)
*B01D 46/10* (2006.01)

(52) U.S. Cl. ......................... 95/273; 55/385.1; 55/495; 55/496; 55/500; 55/501; 55/502; 55/503; 55/DIG. 31; 156/60; 156/73.1; 156/73.5; 264/319; 264/320

(58) Field of Classification Search ............... 55/385.1, 55/495, 496, 500, 501, 502, 503, DIG. 31; 95/273; 156/60, 75.1, 73.5, 73.6, 250; 264/299, 264/319, 320, 322, 333.11
See application file for complete search history.

(56) References Cited

U.S. PATENT DOCUMENTS 3,132,015 A * 5/1964 O'Bryant ..................... 55/491
3,252,580 A * 5/1966 Getzin ......................... 55/503
3,926,708 A * 12/1975 Long .......................... 156/242
4,171,211 A 10/1979 Carter
4,561,587 A 12/1985 Wysocki
4,570,844 A 2/1986 Wysocki
5,087,276 A * 2/1992 Snyder ........................ 55/496
5,188,646 A * 2/1993 Nolen, Jr. .............. 55/DIG. 31
5,364,458 A * 11/1994 Burnett et al. ................ 55/496
5,476,526 A 12/1995 Attermeyer
5,681,630 A * 10/1997 Smick et al. ................. 55/529
5,690,713 A * 11/1997 Bowerman et al. ........... 55/501
5,782,944 A 7/1998 Justice
5,810,898 A * 9/1998 Miller ......................... 55/501
6,044,892 A * 4/2000 Epstein ........................ 55/503
6,059,852 A 5/2000 Olson
6,162,272 A 12/2000 Michaelis et al.
6,568,662 B1 * 5/2003 Schuld ........................ 261/94
6,793,715 B1 * 9/2004 Sandberg ..................... 55/495
6,955,702 B1 * 10/2005 Kubokawa et al. .... 55/DIG. 31

OTHER PUBLICATIONS

Flanders Precision Aire catalog, Dec. 1, 2000 (86 pages).
Purolator Products Air Filtration Company brochure, 1999 (6 pages).
Glasfloss Industries, Inc. brochure (12 pages).

* cited by examiner

*Primary Examiner*—Jason M. Greene
(74) *Attorney, Agent, or Firm*—Flynn, Thiel, Boutell & Tanis, P.C.

(57) ABSTRACT

An air filter arrangement for use in a heating or cooling system including a frame and a filtration member secured within the frame. The frame is defined by a pair of opposed frame components or halves, which are removably or permanently fastened to one another with the filtration member sandwiched therebetween. The frame itself defines a template for permitting trimming of the filter arrangement to one of number of standard filter sizes. The frame is vacuum formed, which allows the frame to be formed from a thin, sheet-like plastic material, and results in a flexible, yet rigid frame which allows easy trimming by the user and provides a filter arrangement with is lightweight and inexpensive to manufacture.

22 Claims, 6 Drawing Sheets

15 46 18 19 46 20 47 15 18 16 19 16 17 10 16 46 19 47 12 26 18 17 47 20 16 26 47 18 19

10
12
15
16
17
18
19
20
26
46
47

C
E
D
B
A
L
W
10
11
12
46

AIR FILTER ARRANGEMENT AND METHOD OF MAKING SAME

FIELD OF THE INVENTION

This invention relates to air filter arrangements for use in heating and cooling systems, and particularly to an air filter arrangement which is sizable by the user or the manufacturer. This invention also relates to a method of making a filter arrangement.

BACKGROUND OF THE INVENTION

In residential and commercial settings, the cleaning of air prior to heating or cooling same has become increasingly important. More specifically, consumers desire improved air filtration due to an increase in allergy symptoms often caused by dust, pollen, and pet dander to name a few, and due to the likelihood of other more dangerous airborne contaminants. Further, the use of modern construction methods which tightly seal homes and other structures in order to improve energy efficiency necessarily results in less air flow from outside the structure and more recirculation of existing air within the structure. Thus, any airborne contaminants present within the structure must be eliminated from the air prior to recirculation.

Traditionally, air filters for heating and cooling systems have been provided in a frame having fixed dimensions which typically correspond to particular heating and cooling system size requirements. Because the size requirements are fixed, retailers must carry a large number of sizes in order to accommodate needs of the buyers. This large number of air filters which must be kept on hand thus necessitates a large amount of storage and shelf space within the store. As a result of the above, air filters which are adjustable by the user were developed.

One example of an adjustable air filter is disclosed in U.S. Pat. No. 5,476,526. The air filter shown in the '526 patent includes an outer frame constructed of channel members which are movable relative to one another to allow adjustment of the frame in both the width and length dimensions. The frame holds a filter member centered between two opposed grids in sandwich fashion. To assemble the air filter, the user determines the filter size for the particular heating or cooling unit and cuts the filter member to the appropriate length and width. Once the filter member is sized, the user then trims the front and rear grids to correspond to the filter size, and the filter member is placed between the two grids. The size of the outer frame is then adjusted by sliding the channel members relative to one another, and the user-sized grid-filter sandwich is assembled into the frame.

U.S. Pat. No. 5,087,276 also discloses a user-sizable furnace filter. This filter arrangement includes a carton defining templates thereon which are used for sizing the filter member and frame. The filter element is first sized by placing same on the paper template, and the filter element is then trimmed to the appropriate length and width. The frame is constructed of channels or right angle members, and the size of the frame is adjusted by slidably engaging the right angle members with one another, and then placing same on the frame template. The width and length of the frame is adjusted by sliding the channels relative to one another to the appropriate size to match the filter element. The filter element is then assembled within the frame.

While the above filter arrangements conveniently allow user-sizing, the arrangements involve many assembly steps, which necessarily complicates the sizing procedure for the end user. Further, the multiple components required for the above arrangements also increases manufacturing costs and also complicates assembly.

In an effort to obviate or at least minimize the above disadvantages associated with conventional filter designs, the air filter arrangement according to the invention includes a filter frame and a filtration member secured within the frame, which frame and filtration member which are selectively sizable by the user or the manufacturer to any one of a number of standard sizes. The frame is advantageously constructed of a pair of frame components or frame halves which in the preferred embodiment are removably secured to one another by a locking arrangement. The filtration member is sandwiched between these frame components and secured therebetween by the locking arrangement. For the convenience of the user, the frame defines thereon guides disposed in predetermined locations to correspond to the standard sizes most commonly required in heating and cooling systems, which guides serve as cutting guides to allow the user to easily and quickly cut the filter arrangement to the correct size. Further, the filter arrangement according to the invention is simple to size, since the frame and filtration member are cut to size in one step.

The locking arrangement according to the invention is releasable and thus permits reuse of the filter frame when the filtration member has become saturated and replacement or cleaning is necessary. More specifically, when replacement of the filtration member is necessary, the frame components are pulled apart from one another to release the filtration member, the filtration member is either cleaned or disposed of, and the clean filtration member or a new filtration member is placed between the frame components which are then locked together to securely position the filtration member therebetween. While a releasable locking arrangement is desirable primarily to allow reuse of the frame for environmental purposes, it will be appreciated that other locking arrangements are within the scope of the invention. For example, the opposed frame components can be permanently secured to one another through plastic welds, adhesive, or staples, for example.

The plastic filter frame pursuant to the invention is advantageously formed from a sheet-like plastic material by vacuum molding, which is a relatively inexpensive process, and also results in a frame which is sufficiently rigid, but also lightweight and very thin, which effectively reduces material and manufacturing costs.

Other objects and purposes of the invention, and variations thereof, will be apparent upon reading the following specification and inspecting the accompanying drawings.

Figure 1:
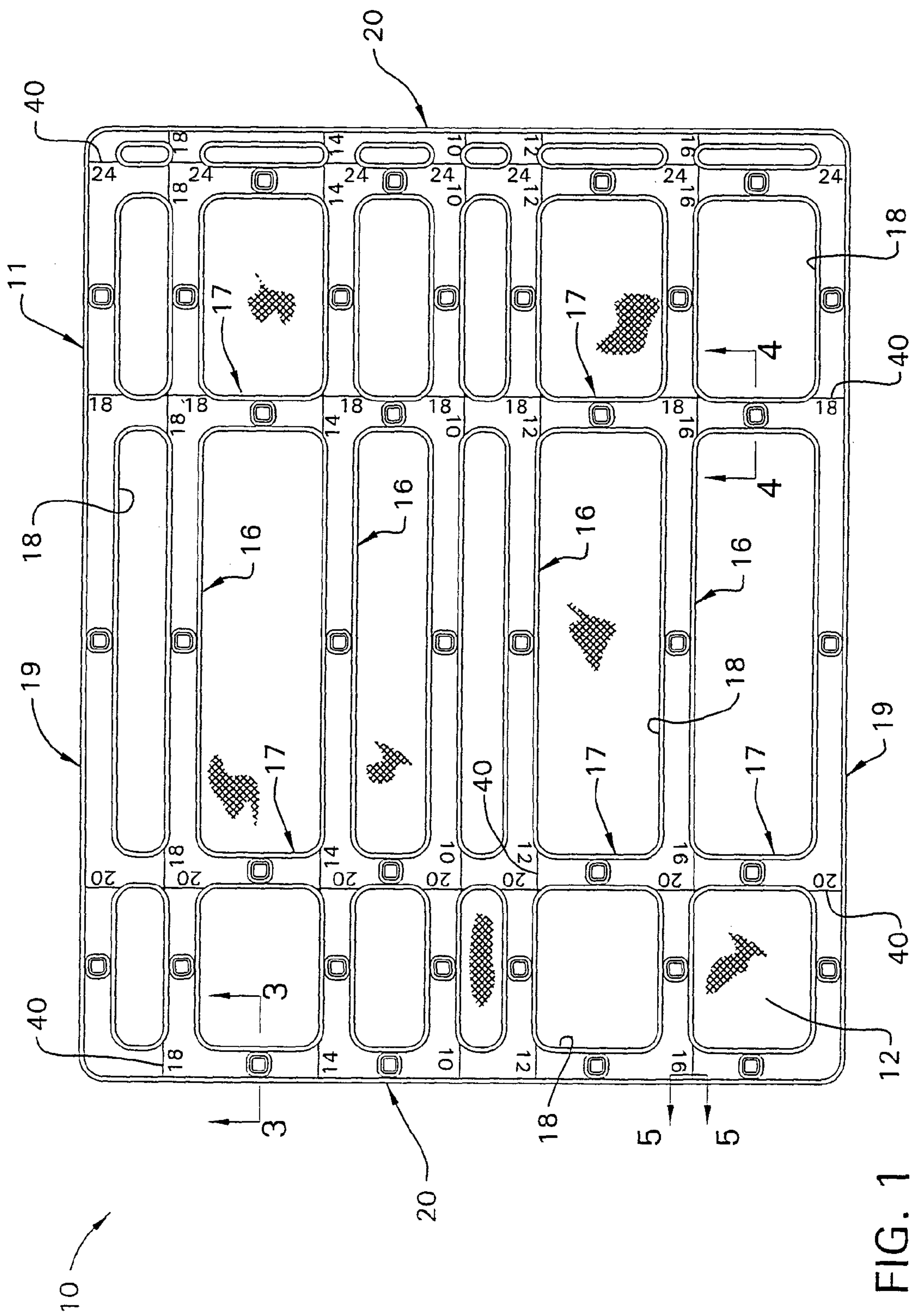
FIG. 1 is a plan view of the filter arrangement according to the invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
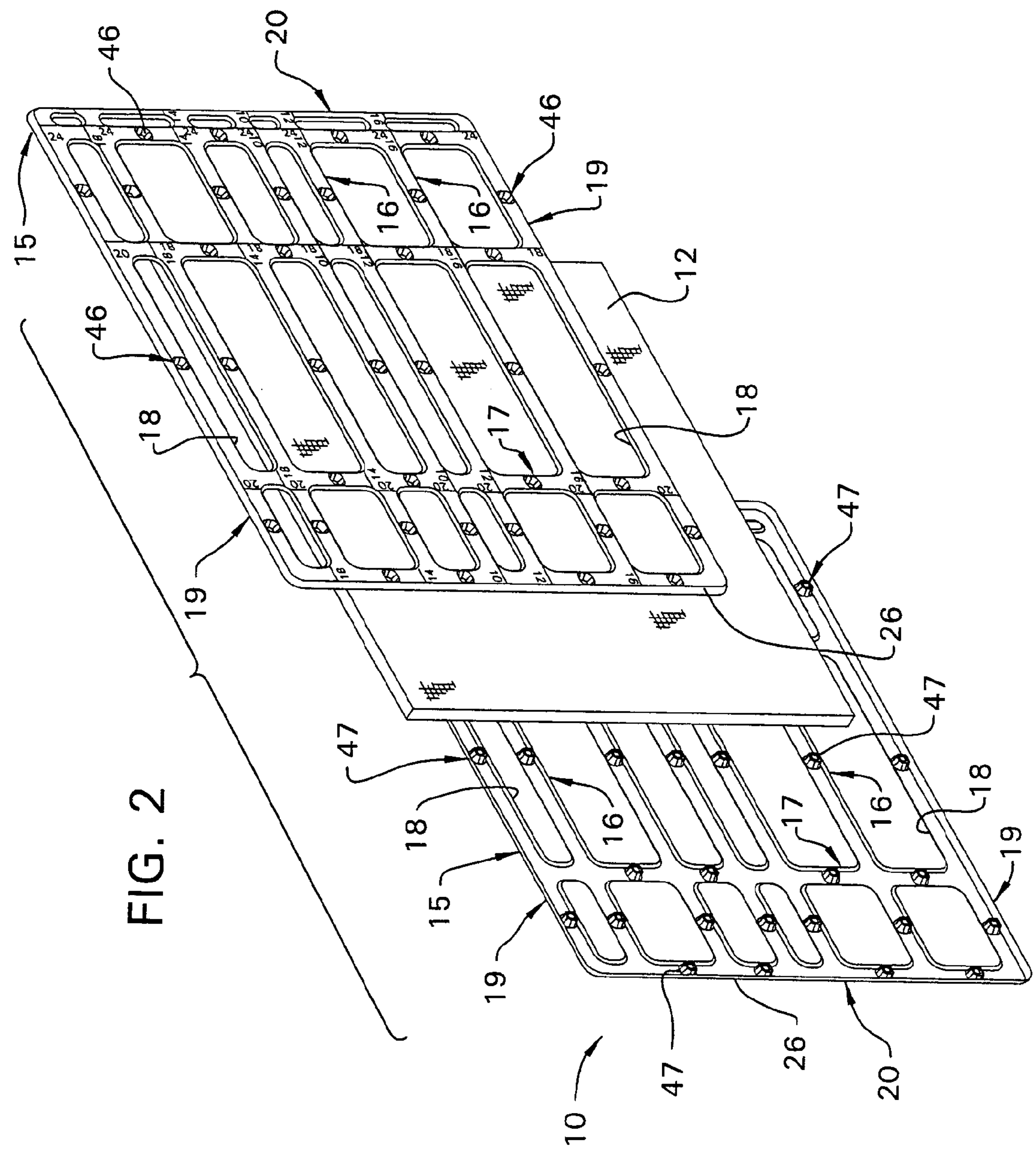
FIG. 2 is an exploded perspective view of the filter arrangement.

Referring to FIGS. 1 and 2, the invention generally relates to a filter arrangement 10 including a frame 11 which secures therein a sheet-like filtration member or panel 12. In the illustrated embodiment, the frame 11 is defined by a pair of opposed frame components or frame halves 15. The configurations of the respective frame components 15 are similar, and in fact are mirror images of one another with respect to their overall configuration, and therefore only one of such components 15 will be described in detail herein.

Frame component 15 is defined by a plurality, and here seven, of longitudinal legs 16 which are interconnected to one another by a plurality, and here five, of transverse legs 17. The legs 16 extend along the longitudinal length of the frame 11 and define the overall length L or maximum dimension of the filter arrangement 10, and the legs 17 extend along the transverse width W of the frame 11 and define the overall width of the filter arrangement 10. The longitudinal legs 16 are spaced from one another in the transverse direction of the frame 11 by the legs 17, and the legs 16 and 17 thus provide the frame 11 with an open, grid-like configuration defining a plurality of openings 18. A pair of outermost longitudinal legs 19 along with a pair of outermost transverse legs 20 together define an outer periphery of the filter arrangement 10.

Figure 3:
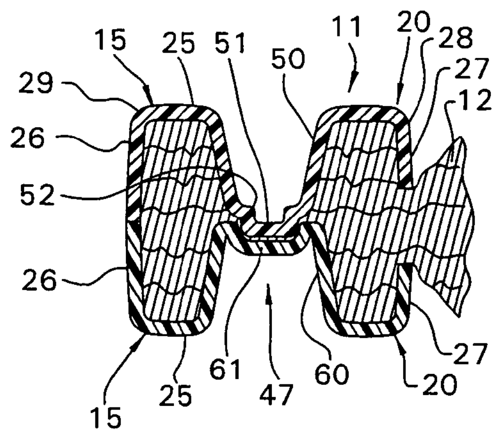
FIG. 3 is an enlarged cross-sectional view taken generally along line 3—3 in FIG. 1 which shows the locking arrangement.

FIG. 3 illustrates a cross-section through one of the outermost transverse legs 20, but it will be understood that the opposite leg 20 and outermost longitudinal legs 19 have similar such cross-sections. Leg 20 is defined by an elongate and generally flat base wall 25 which is joined to a generally vertical and elongate outer side wall 26 which projects downwardly from an outer edge region of the base wall 25. An elongate inner side wall 27 is joined to an opposite inner edge region of base wall 25 and projects downwardly therefrom. Inner side wall 27 in the illustrated embodiment has a smaller vertical dimension than the outer side wall 26. The inner and outer side walls 27 and 26 are each joined to base wall 25 through respective curved inner and outer elongate edge portions 28 and 29.

Figure 4:
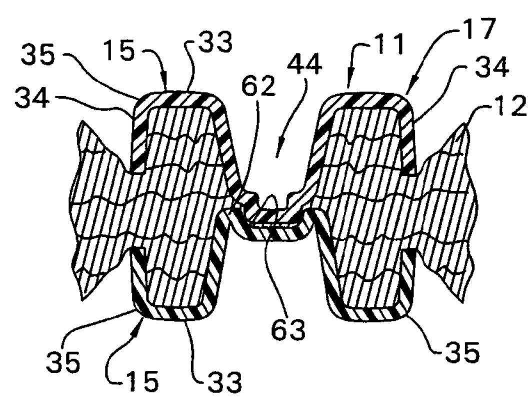
FIG. 4 is an enlarged cross-sectional view taken generally along line 4—4 in FIG. 1.

FIG. 4 illustrates a cross-section through an inner transverse leg 17, but it will be understood that the remaining transverse legs 17 disposed between the outermost transverse legs 20 as well as the inner longitudinal legs 16 disposed between outermost longitudinal legs 19 have similar cross-sections. Inner transverse leg 17 is defined by a generally flat and elongate base wall 33 which is joined at opposite edges thereof to respective side walls 34 which project generally downwardly from these edges. In the illustrated embodiment, side walls 34 are of a similar vertical dimension. The side walls 34 adjoin the base wall 33 through respective curved edge portions 35.

Figure 5:
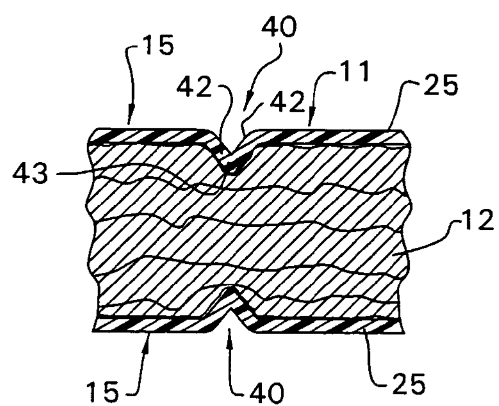
FIG. 5 is an enlarged cross-sectional view taken generally along line 5—5 in FIG. 1 which shows a cutting guide.

Referring back to FIG. 1, longitudinal legs 16 and 19 and transverse legs 17 and 20 respectively define thereon a plurality of cutting or trimming guides 40, which guides 40 in the illustrated embodiment are configured as linear grooves which extend across the entire transverse extent of the respective leg. FIG. 5 illustrates a guide 40 defined in one of the outermost transverse legs 20, but it will be understood that the opposite outer transverse leg 20 as well as the inner transverse legs 17 and longitudinal legs 16 and 19 have similar cross-sections in the areas which define the respective guides 40. The guides 40 in the illustrated embodiment are integrally and monolithically formed with the respective leg and are defined by a pair of legs 42 which project inwardly from the respective leg and angle towards one another and adjoin one another at a generally V-shaped intersection 43.

The respective frame components or halves 15 are secured to one another by a locking arrangement 44. In the preferred embodiment, the locking arrangement 44 allows the respective components 15 to be releasably fastened to one another in opposed, face-to-face relation, so as to allow cleaning of the filtration member 12 or replacement thereof. However, it will be appreciated that other more permanent locking arrangements are within the scope of the present invention, and are discussed further below.

With reference to FIGS. 2 and 3, locking arrangement 44 is a friction-fit type arrangement which allows frame components 15 to be press-fit together so as to sandwich the filtration member 12 therebetween. Locking arrangement 44 includes a plurality of cooperating locking members defined by male members 46 which mate with correspondingly located female members 47. More specifically, the legs of one frame component 15 define thereon identical male members 46 which project sidewardly from an inwardly facing side of the frame component 15, and the legs of the opposite frame component 15 define thereon identical female members 47 which project sidewardly from an inwardly facing side thereof for cooperative mating with the respective male members 46. In the illustrated embodiment, the male and female members are integrally and monolithically formed with the legs of the respective frame components. It will be appreciated that the male and female members are disposed on their respective frame components in locations which allow the components 15 to be secured to one another such that the frame legs, openings 18 and outer edges of the respective frame components 15 align with one another.

Figure 6:
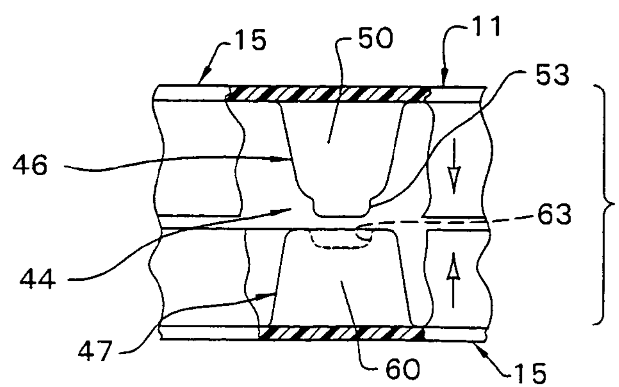
FIG. 6 is an enlarged, partially exploded end view of the two frame components and their assembly, with portions of the outer side walls thereof broken away to show the locking arrangement.

Male member 46 is generally conically-shaped, and includes an outer annular side wall 50 having its maximum diameter portion located adjacent the base wall 25, 33 of the respective leg. Side wall 50 is joined to a generally flat wall 51 by a stepped portion or shoulder 52, such that flat wall 51 is disposed inwardly of side wall 50 and along with stepped portion 52 defines a protruding nose 53 (FIG. 6) of male member 46.

Female member 47 is defined by a generally conically-shaped outer annular side wall 60 having its maximum diameter portion located adjacent the base wall 25, 33 of the respective leg of the opposite frame component 15. Side wall 60 is joined to a generally flat wall 61 through a stepped part or shoulder 62, and wall 61 and shoulder 62 together define a recess 63. Recess 63 has a diameter which is similar to the outer diameter of nose 53.

The filter arrangement 10 according to the invention is assembled as follows. First, the frame components 15 are arranged so that their inner sides face towards one another, and so that the openings 18 of the respective components 15 are in alignment or registration with one another. Filtration member 12 is then positioned between the respective frame components 15 adjacent the inwardly facing sides thereof, so that the terminal edges of the filtration member 12 are in alignment with the opposed outermost longitudinal and transverse legs 19 and 20 of the respective frame components 15. The frame components 15 are then brought into engagement with one another by pressing the frame members 15 from opposite sides of the arrangement 10, which causes the noses 53 of the respective male members 46 to engage or press into the respective recesses 63 of the opposed female members 47. As shown in FIGS. 3 and 4, the filtration member 12 at each of the male/female fastening areas of the frame 11 is pinched or compressed into the recesses 63 by the respective noses 53, such that the filtration member 12 is effectively secured between the opposed frame components 15 and prevented from moving relative thereto.

As shown in FIGS. 3 and 4, when the frame halves 15 are mated with one another with the filtration member 12 disposed therebetween, the outer side walls 26 of the outer longitudinal and transverse legs 19 and 20 substantially abut one another at the opposed terminal edges thereof, so that the outer periphery of the frame 11 defines a generally closed exterior and peripherally extending surface. Further, when the frame halves 15 are interconnected, the opposed inner side walls 27 of outer legs 19 and 20 (FIG. 3) and the opposed side walls 34 of the inwardly disposed legs 17 and 19 are vertically spaced from one another such that the filtration member 12 is not completely pinched between the side walls at these areas which allows a larger cross-sectional area of the filtration member 12 to be used for filtering air.

As mentioned above, when saturation of the filtration member 12 occurs, same can be removed from the frame 11 by simply pulling on the frame 11 from opposite sides of thereof to release the male and female fastening members from one another, and the filtration member 12 can be cleaned, or alternatively can be disposed of and replaced with a fresh filtration member. Thus, the frame 11, as well as the filtration member 12 if desirable or necessary, can be reused.

Figure 12:
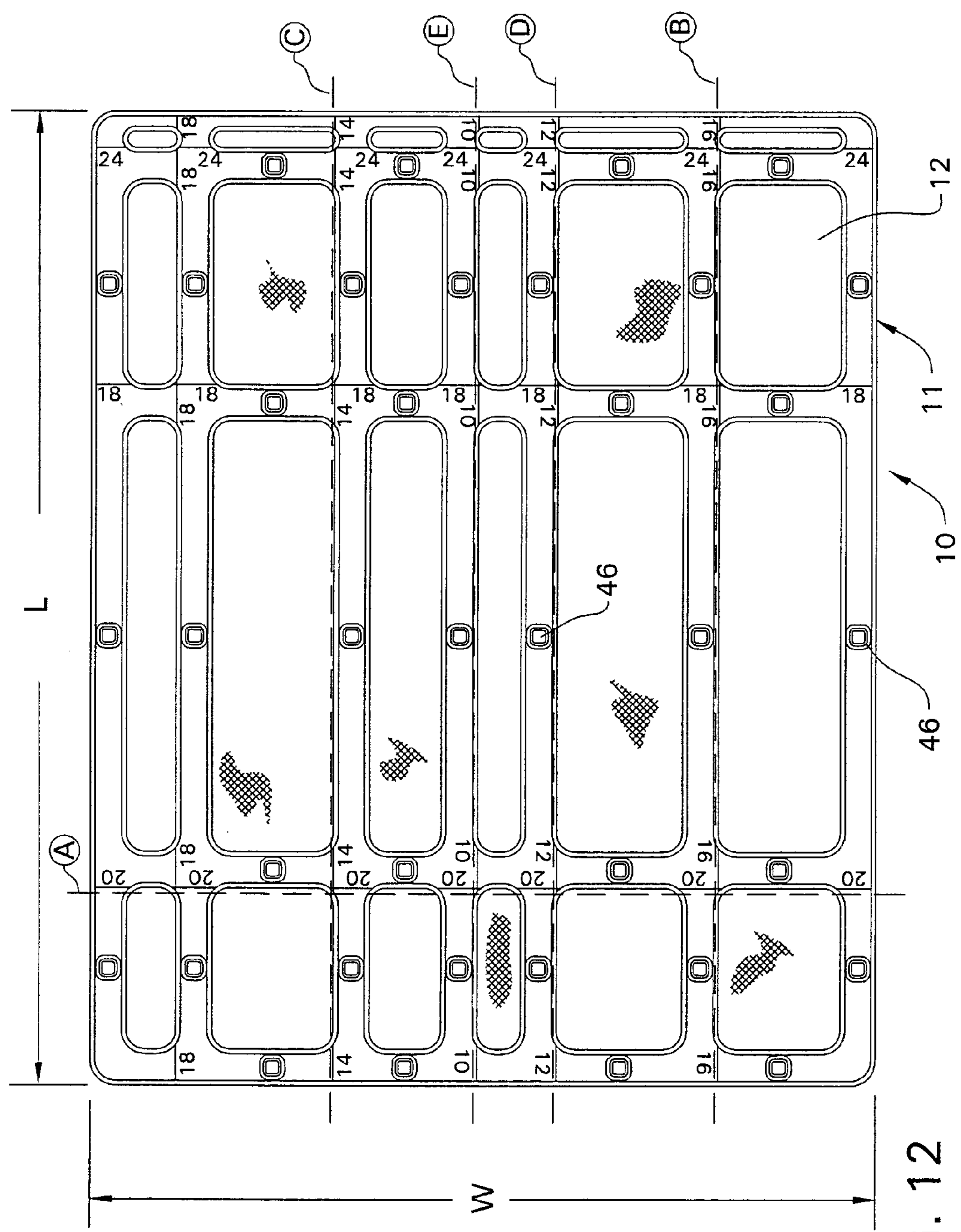
FIG. 12 is a plan view of the filter arrangement as shown in FIG. 1, but illustrates the lines along which the arrangement can be trimmed for custom sizing.

As shown in FIGS. 1, 2 and 12, the opposed frame components 15 are provided with guides 40, and are also provided with number markings thereon, such that the frame 11 itself defines a template for easy trimming of the filter arrangement 10 to the appropriate size. The number markers are provided adjacent each of the guides 40. In this regard, heating and cooling systems typically require a filter arrangement having one of the following sizes (in inches): 16×20; 16×25; 20×20 or 20×25. Other sizes which are somewhat less common than the above are: 14×20; 14×25; 12×20; 12×25 and 10×20. The number markings included on the frame 11 allow the user to easily size the filter arrangement 10 to any of the above sizes (and others) as discussed below.

Figure 13:
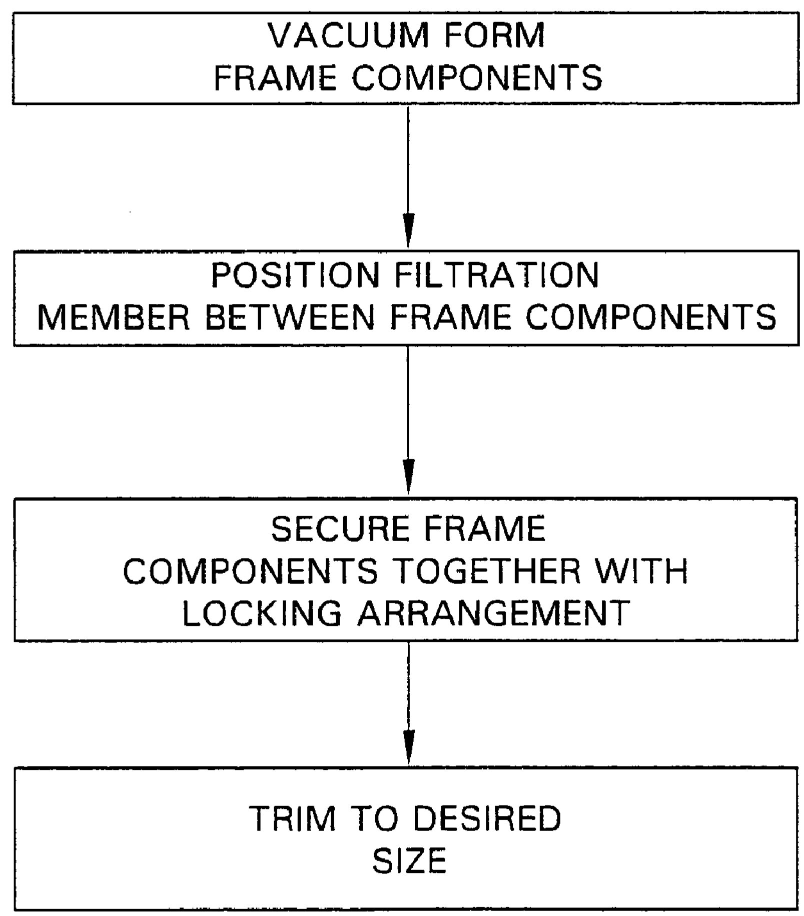
FIG. 13 is a schematic diagram illustrating a method of making the filter arrangement according to the invention.

With the filter arrangement 10 assembled as discussed above, the user determines what size filter is needed for the particular heating or cooling system. The filter arrangement 10 illustrated in FIGS. 1 and 12 is initially sized at 20×25, and if this is the correct size for the system, then obviously no trimming is required. However, if the required size is 16×20, then, using the number markings to locate the proper trim lines, the user simply trims the filter arrangement 10 with scissors along lines A and B as shown in FIG. 13. If the required size is 16×25, then the user trims along line B. If the required size is 20×20, then the user trims along line A.

The above sizes are the most common for heating and cooling systems. However, the filter arrangement 10 according to the invention allows sizing to other less common sizes, for example, 14×20 (trim along lines A and C), 14×25 (trim along line C), 12×20 (trim along lines A and D), 12×25 (trim along line D), and 10×20 (trim along lines A and E). Additional number markings and guides 40 are also provided to allow trimming of the arrangement to provide same with a length of 18 or 24 inches, and a width of 18 inches.

Once the filter arrangement is trimmed to the required size, the placement of the male and female members 46 and 47 on the frame legs of the locking arrangement 44 ensure that the opposed frame components 15 will stay locked together.

The filtration member 12 may be constructed of unwoven electrostatic polyester panel or a combination of polyester and polypropylene, and in the illustrated embodiment has a thickness of approximately ½ inch. It will be appreciated that filtration member 12 may be constructed of other materials than those mentioned above.

The frame 11 in the illustrated embodiment is constructed of a flexible and thin plastic which will allow cutting of the filter frame 11 with household scissors. One preferred material from which the frame components can be formed is polyethylene terephthalate (PET) which is thin, flexible and easily molded, resistant to humidity, and yet sufficiently rigid to support the filtration member 12. Recycled polyethylene terephthalate (RPET) may also be used. PET is typically available in sheet form, and the frame components 12 are advantageously formed by vacuum forming, a conventional forming process where shaping is effected by a vacuum applied through holes in a female tool. The frame 11 according to the invention is formed utilizing a Senco Model 2500 vacuum forming machine, manufactured by Sencorp Systems, Inc. Vacuum forming is a conventional and well-known forming process, and will accordingly not be discussed in detail herein. The forming of the frame 11 by vacuum molding provides the respective frame components 12 with a very small thickness, for example in the range of about 0.0005 inch to about 0.030 inch, and preferably about 0.0010 inch to about 0.0050 inch. The small thickness of the frame components 15 permits easy cutting and provides a lightweight and inexpensive filter arrangement 10. Further, the small thickness of the frame components 15 and the guides 40 advantageously allow the user to trim the arrangement with ordinary household scissors, and thus no special cutting equipment is necessary.

FIG. 13 diagrammatically illustrates a process for making a filter arrangement 10 according to the invention, which includes vacuum forming the frame components 15, positioning the filtration member 12 between the respective frame components 15, securing the frame components 15 to one another with the locking arrangement 44, and trimming the assembled arrangement 10 to the desired dimensions.

Other materials from which frame 11 may be constructed are polyvinylchloride (PVC), polystyrene (PS), high impact polystyrene (HIPS), or other thermo-formable materials.

It will be appreciated that the filter arrangement 10 can be sold completely assembled as outlined above, and the user then trims the filter arrangement 10 to the appropriate size after purchasing same from the retailer. Alternatively, the user may attach the frame members 15 to one another. Because the arrangement 10 can be trimmed to any one of a number of required sizes, the retailer need not stock multiple filters of varying sizes to accommodate purchasers. Further, the entire filter arrangement 10, including the opposed frame components 15 and the filtration member 12, can advantageously be trimmed to size in one step, which reduces installation time on the part of the consumer.

However, the filter arrangement according to the invention may alternatively be manufactured, for example, in the four most commonly used sizes, 16×20, 16×25, 20×20 and 20×25. These standard-sized filter arrangements according to the invention may be provided in the above fixed sizes so that the consumer can simply choose the proper size at the retail location, meaning that no trimming of the arrangement is necessary prior to installation.

The locking arrangement 44 secures all three components of the filter arrangement 10, i.e. the two frame components 15 and the filtration member 12, to one another at multiple locations along the arrangement 10, so that the arrangement 10 can be trimmed to any required size and stay intact. Further, the locking arrangement 44 allows disassembly and reassembly by the user without the need for tools.

It will be appreciated that the friction-fit type locking arrangement 44 discussed above is only one example of a locking arrangement, and other arrangements may be utilized to secure the frame components 15 and filtration member 12 to one another. The male and female locking members need not be circular in shape, and may instead be elongate in shape so as to extend along significant portions of the respective frame legs. This alternative may advantageously require a fewer number of locks.

Figure 7:
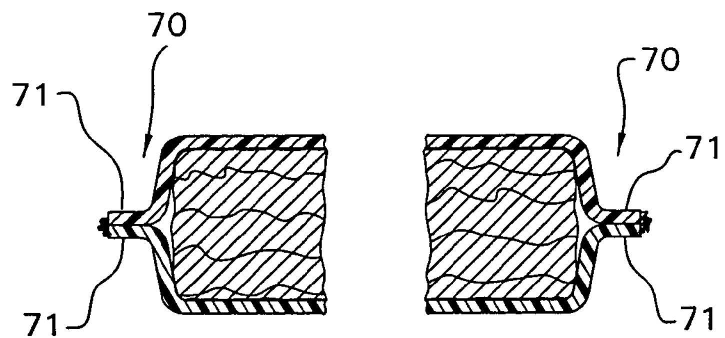
FIG. 7 is an enlarged cross-sectional and fragmentary view of an alternative locking arrangement for the frame components incorporating a plastic weld, which shows opposite peripheral edges of the filter arrangement.

FIGS. 7–11 illustrate alternative forms of locking arrangements which may be utilized in accordance with the present invention. FIG. 7 is a cross-sectional view through the filter arrangement, showing outer portions of a pair of outermost longitudinal or transverse legs. These legs are formed with sidewardly extending flanges 71 which are permanently mechanically fastened to one another by using localized heat to plastically weld the frame components to one another. The inner areas of the frame components can be secured to one another in a similar manner along the edges of the respective legs, which would also serve to permanently fix the filtration member to the frame components along these inner areas. In this embodiment, the filter arrangement, once saturated, would be replaced with a new arrangement.

Figure 8:
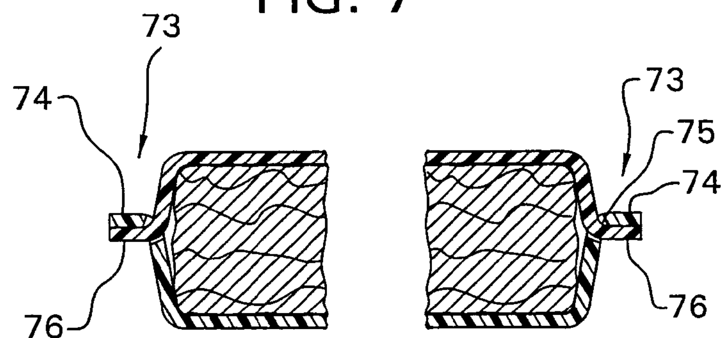
FIG. 8 is an enlarged cross-sectional and fragmentary view of another alternative locking arrangement incorporating a tab-and-slot arrangement.

FIG. 8 illustrates a further locking arrangement 73, wherein both the inner edges (not shown) and the outer edges of the transverse and longitudinal legs of one frame component are formed with flanges 74 which respectively define slots 75 therein. The legs of the opposite frame component define thereon tabs 76 which are sized to fit within the correspondingly located slots 75, so that the frame components can be releasably fastened to one another by engaging the tabs 76 within the slots 75.

Figure 9:
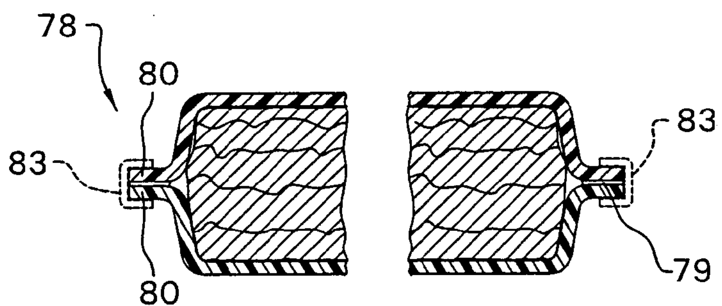
FIG. 9 is an enlarged cross-sectional and fragmentary view of another alternative locking arrangement incorporating adhesive.

FIG. 9 illustrates a further locking arrangement 78 which includes strips of adhesive 79 between opposed flanges 80 of the respective frame components, which flanges 80 may be provided on opposite sides of some or all of the longitudinal or transverse legs to accommodate the adhesive 79. Alternatively, releasable hook-and-loop type fasteners may be used in place of adhesive 79, which would allow reuse of the frame components.

FIG. 9 also illustrates tape 83 may be used as an alternative to, or in addition to, adhesive 79. As shown in dotted lines, the tape 83 may be wrapped around the opposed flanges 80 of the legs to secure the frame components to one another.

Figure 10:
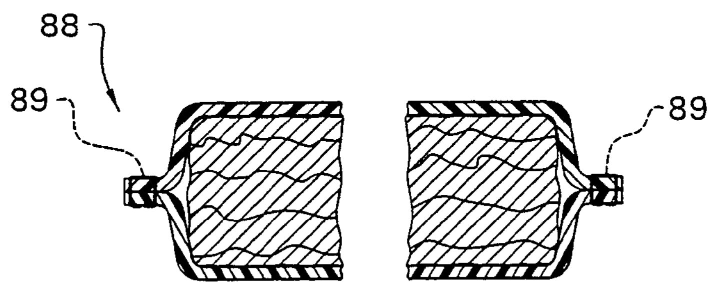
FIG. 10 is an enlarged cross-sectional and fragmentary view of another alternative locking arrangement incorporating staples.

FIG. 10 shows yet another locking arrangement 88 which incorporates conventional staples 89 which penetrate through opposed flanges 90 of the respective frame components. Rivets may also be used in place of the staples 89.

All of the above locking arrangement alternatives can also be used with fixed size filters as discussed above, that is, filter arrangements constructed according to the invention which are sized by the manufacturer and do not require further trimming by the purchaser. In this instance, since no trimming of the arrangement is necessary, it is conceivable that only the outermost edges of the outermost legs of the opposed frame members be permanently or removably fastened to one another.

Figure 11:
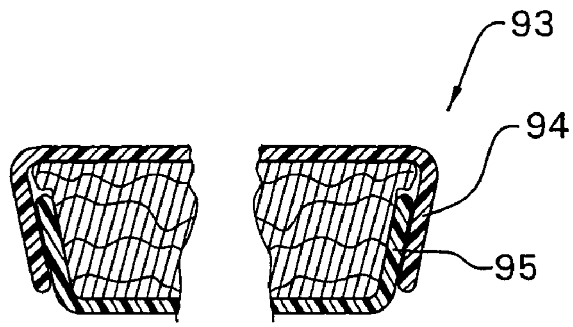
FIG. 11 is an enlarged cross-sectional and fragmentary view of another alternative locking arrangement incorporating an interference fit between the frame components.

FIG. 11 illustrates a further locking arrangement 93 for attaching the frame components to one another. In this embodiment, one frame component is provided with a downwardly and inwardly projecting flange 94 along its perimeter (i.e. along the outermost edges of the transverse and longitudinal legs), and the opposite frame member is provided with an upwardly and outwardly projecting flange 95 along its perimeter. The frame component including the flange 95 is dimensioned slightly smaller than the opposite frame member. The two frame components thus can be snapped together, so that the smaller frame member is trapped by the confining flange 94. It is envisioned that this locking arrangement 93 can be utilized only with the non-adjustable pre-sized filter arrangements according to the invention mentioned above.

Although particular preferred embodiments of the invention are disclosed in detail for illustrative purposes, it will be recognized that variations and modifications of the disclosed apparatus, including the rearrangement of parts, lie within the scope of the present invention.

What is claimed is:

1. An air filter arrangement for use in a heating or cooling system, said arrangement comprising:

a frame including a pair of frame components disposed in face-to-face relation with one another, each said frame component defining an opening therein, one of said frame components defining thereon a plurality of trimming guides disposed in predetermined locations on said one frame component so as to correspond to at least one standard size, said trimming guides being integrally formed with said one frame component and comprising grooves which extend inwardly with respect to an outwardly facing side surface of said one frame component and which open through said side surface; and a filtration member disposed between said frame components and being exposed through said openings defined in the respective frame components to allow the passage of air through said arrangement, said filtration member having a solid and uninterrupted portion compressed between a pair of opposed sections of the respective frame components to maintain said filtration member substantially stationary relative to said frame components.

2. The arrangement of claim 1 wherein said frame components are constructed of plastic.

3. An air filter arrangement for use in a heating or cooling system, said arrangement comprising:

a frame including a pair of frame components disposed in face-to-face relation with one another, each said frame component defining an opening therein, said frame components being vacuum formed of plastic and each having a thickness of between about 0.0050 inch and about 0.030 inch; and a filtration member disposed between said frame components and being exposed through said openings defined in the respective frame components to allow the passage of air through said arrangement, said filtration member having a solid and uninterrupted portion compressed between a pair of opposed sections of the respective frame components to maintain said filtration member substantially stationary relative to said frame components.

4. The arrangement of claim 3, wherein said opposed sections of said frame components define respective locking members, said locking members of the respective frame components directly engaging one another to secure said frame components to one another and fix said filtration member therebetween.

5. The arrangement of claim 3 wherein said frame components are the sole components which define said frame, and said frame components include respective peripheral edge portions disposed in closely adjacent relation with one another so as to peripherally enclose and confine a peripheral edge of said filtration member on all sides thereof.

6. The arrangement of claim 4 wherein said locking member of one of said frame components is a female locking member and said locking member of the other frame component is a male locking member configured to cooperatively engage said female locking member, said male and female locking members being press-fit to one another to secure said frame members together and to fix said filtration member therebetween.

7. The arrangement of claim 4 wherein said locking members frictionally engage one another and allow disassembly of said frame components from one another to permit cleaning or replacement of said filtration member.

8. An air filter arrangement for use in a heating or cooling system, said arrangement comprising:

a filtration member;

a frame constructed of a thin, sheetlike material, said frame being defined by a pair of frame components disposed in opposed relation with one another and sandwiching said filtration member therebetween, said frame components defining openings therein to expose portions of said filtration member; and a locking arrangement, each said frame component defining thereon a locking member which forms part of said locking arrangement, said locking members of the respective frame components directly engaging one another to secure said frame components to one another, a solid nonperforated portion of said filtration member being compressed between said engaged locking members such that said filtration member is substantially non-movable relative to said frame.

9. A method of making and assembling an air filter arrangement for a heating or cooling system, said method comprising:

vacuum forming a pair of frames from a thin sheetlike plastic material;

positioning a filtration member between the formed frames;

securing the frames to one another by engaging a pair of opposed locking members disposed on the respective frames with one another; and compressing a solid, non-perforated portion of the filtration member between the respective locking members.

10. The method of claim 9 further including the step of trimming said frame to a selected size, after said step of securing.

11. An air filter arrangement made by the method of claim 9.

12. An air filter arrangement made by the method of claim 9, said arrangement having frames constructed of PET and having a thickness of between about 0.0010 and about 0.0050 inch.

13. The method of claim 9 wherein said step of forming includes vacuum forming the frames such that each frame has a thickness of between about 0.0010 and 0.0050 inch.

14. The arrangement of claim 4 wherein one said locking member comprises a protrusion cantilevered from an inner surface of one said frame component, and the other said locking member comprises a recess which opens inwardly towards said inner surface and is sized to receive said protrusion therein, said solid and uninterrupted portion of said filtration member being compressed between substantial portions of both said protrusion and said recess such that said solid and uninterrupted portion is disposed within said recess.

15. The arrangement of claim 8 wherein said locking members define juxtaposed and inwardly-facing respective locking faces which engage one another, said solid nonperforated portion of said filtration member being disposed and compressed between substantial portions of said locking faces.

16. The arrangement of claim 8 wherein said solid nonperforated portion of said filtration member is disposed between said engaged locking members so as to prevent substantial contact of said engaged locking members with one another.

17. The arrangement of claim 8 wherein each said frame component is defined by a first plurality of legs disposed in spaced-apart relation with one another and interconnected to one another by a plurality of spaced-apart second legs which extend transversely with respect to said first legs, said first and second legs of each said frame component providing said frame with a gridlike pattern, said locking members of the respective frame components frictionally engaging one another to secure said frame components to one another.

18. The arrangement of claim 8 wherein said locking members are integrally formed with their respective frame components such that each said frame component comprises a one-piece monolithic component.

19. The arrangement of claim 17 wherein one of said frame components defines a template thereon which is integrally formed with said one frame component, said template including a plurality of grooves extending inwardly in a direction away from an outwardly facing side of said one frame component, each said groove being defined in a respective leg of said one frame component and extending transversely across said leg to permit cutting of said frame to size said arrangement to one of a plurality of predetermined sizes, said template additionally including a plurality of number markings disposed adjacent the respective grooves which define various standard lengths and widths to which said arrangement can be sized.

20. The method of claim 9 further including determining the proper size for the filter arrangement for the particular heating or cooling system, and, after said step of positioning, sizing the filter arrangement to the proper size by simultaneously cutting both the frames and the filtration member disposed between.

21. The method of claim 20 further including providing at least one of the frames with cutting guides disposed at predetermined locations so as to correspond to a plurality of standard filter sizes, and said step of sizing includes sizing the filter arrangement to the proper size by inserting an edge of the cutting tool into a selected guide and cutting the arrangement to the proper size.

22. An air filter arrangement for use in a heating or cooling system, said arrangement comprising:

a filtration member;

a frame constructed of a thin, sheet-like material, said frame being defined by a pair of frame components disposed in opposed relation with one another and sandwiching said filtration member therebetween, said frame components defining openings therein to expose portions of said filtration member, one of said frame components defining thereon at least one trimming guide disposed in a predetermined location on said one frame component so as to correspond to at least one standard size; and a locking arrangement, each said frame component defining thereon a locking member which forms part of said locking arrangement, said locking members of the respective frame components directly engaging one another and being secured to one another by one of: a plastic weld; adhesive; and a staple to secure said frame components to one another and fix said filtration member therebetween.

* * * * *